(12) United States Patent
Slaney et al.

(10) Patent No.: US 9,384,214 B2
(45) Date of Patent: Jul. 5, 2016

(54) IMAGE SIMILARITY FROM DISPARATE SOURCES

(75) Inventors: Malcolm Slaney, Palo Alto, CA (US); Kilian Quirin Weinberger, Mountain View, CA (US); Kaushal Kurapati, San Jose, CA (US); Sriram J. Sathish, Karnataka (IN); Polly Ng, Iiolly, NY (US)

(73) Assignee: Yahoo! Inc., Sunnyvale, CA (US)

( * ) Notice: Subject to any disclaimer, the term of this patent is extended or adjusted under 35 U.S.C. 154(b) by 717 days.

(21) Appl. No.: 12/533,475

(22) Filed: Jul. 31, 2009

(65) Prior Publication Data

US 2011/0029561 A1    Feb. 3, 2011

(51) Int. Cl.
*G06F 17/30*    (2006.01)

(52) U.S. Cl.
CPC .... *G06F 17/30247* (2013.01); *G06F 17/30265* (2013.01); *G06F 17/30271* (2013.01)

(58) Field of Classification Search
CPC .................. G06F 17/30247; G06F 17/30265; G06F 17/30271; G06F 17/30038
USPC ......... 707/748, 749, 758, 793, 794, 796, 803, 707/915
See application file for complete search history.

(56) References Cited

U.S. PATENT DOCUMENTS

| | | | |
|---|---|---|---|
| 6,446,060 B1 * | 9/2002 | Bergman et al. | 707/770 |
| 6,922,699 B2 * | 7/2005 | Schuetze et al. | |
| 7,564,994 B1 * | 7/2009 | Steinberg et al. | 382/118 |
| 7,933,972 B1 * | 4/2011 | Issa et al. | 709/219 |
| 8,009,921 B2 * | 8/2011 | Csurka | 382/228 |
| 8,855,372 B2 * | 10/2014 | Rodriguez | G06F 17/30265 348/169 |
| 8,868,555 B2 * | 10/2014 | Erol | G06F 17/30247 707/736 |
| 9,082,162 B2 * | 7/2015 | Gokturk | G06F 17/3025 |
| 2005/0105798 A1 * | 5/2005 | Nguyen et al. | 382/181 |
| 2007/0106744 A1 * | 5/2007 | Bicheno et al. | 709/213 |
| 2008/0091723 A1 * | 4/2008 | Zuckerberg et al. | 707/104.1 |
| 2009/0147003 A1 * | 6/2009 | Do et al. | 345/427 |
| 2009/0204637 A1 * | 8/2009 | Li et al. | 707/104.1 |
| 2009/0228510 A1 * | 9/2009 | Slaney et al. | 707/102 |
| 2009/0299999 A1 * | 12/2009 | Loui et al. | 707/5 |
| 2010/0048242 A1 * | 2/2010 | Rhoads et al. | 455/556.1 |
| 2010/0211605 A1 * | 8/2010 | Ray | 707/780 |
| 2010/0223258 A1 * | 9/2010 | Ghahramani | G06F 17/30247 707/723 |
| 2011/0022529 A1 * | 1/2011 | Barsoba et al. | 705/319 |

* cited by examiner

*Primary Examiner* — Tony Mahmoudi
*Assistant Examiner* — Merilyn Nguyen
(74) *Attorney, Agent, or Firm* — Hickman Palermo Becker Bingham LLP; Edward A. Becker

(57) ABSTRACT

A search engine determines a set of other images that are similar to a user-selected image, and presents those other images to the user. In determining whether two images are sufficiently similar to each other to merit presentation of one, the search engine determines a Euclidean distance between separate feature vectors that are associated with each of the images. Each such vector indicates diverse types of information that is known about the associated image. The types of information included within such a vector may include attributes that reflect visual characteristics that are visible in an image, verbal tags that have been associated with the image users in a community of users, concepts derived from those tags, coordinates that reflect a geographic location at which a camera that produced the image was when the camera produced the image, and concepts related to groups with which the image is associated.

12 Claims, 4 Drawing Sheets

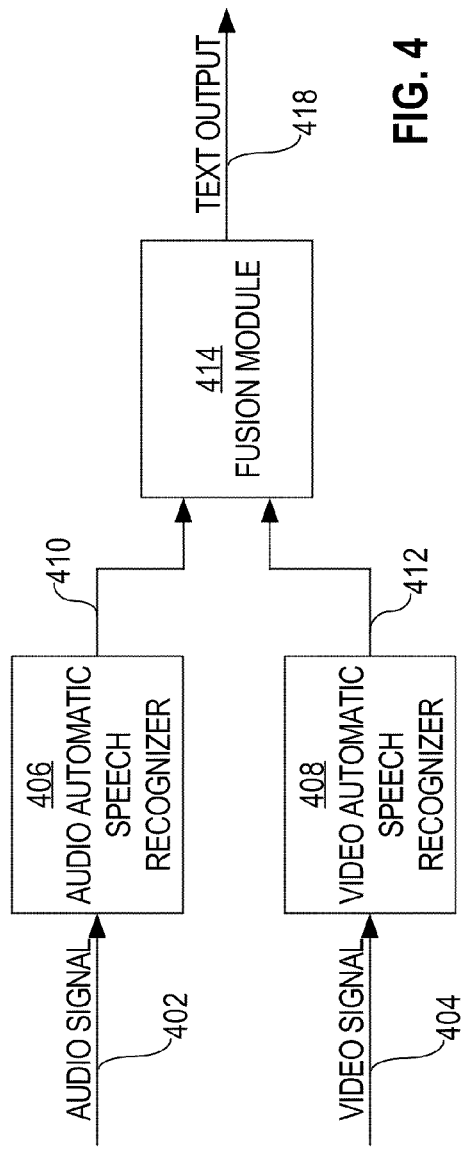
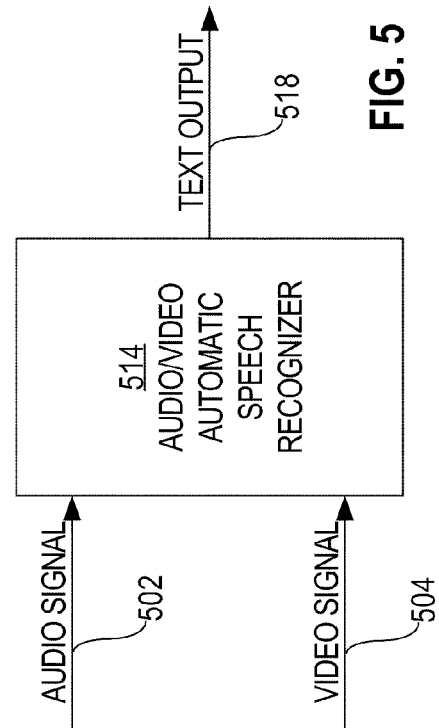
FIG. 4
FIG. 5

IMAGE SIMILARITY FROM DISPARATE SOURCES

FIELD OF THE INVENTION

The present invention relates to techniques for helping a user to locate other images that are similar, based on some characteristic in which the user is interested, to an image that the user has already discovered.

BACKGROUND

Internet search engines allow computer users to use their Internet browsers (e.g., Mozilla Firefox) to submit search query terms to those search engines by entering those query terms into a search field (also called a "search box"). After receiving query terms from a user, an Internet search engine determines a set of Internet-accessible resources that are pertinent to the query terms, and returns, to the user's browser, as a set of search results, a list of the resources most pertinent to the query terms, usually ranked by query term relevance.

These resources are often individual web pages or web sites. Each search result item in a list of search result items may specify a title of a web page or web site, an abstract for that web page or web site, and a hyperlink which, when selected or clicked by the user, causes the user's browser to request the web page (or a web page from the web site) over the Internet.

Some Internet search engines also provide mechanisms through which a user can specify that he is interested only in search results that are images. Under such circumstances, in response to the user's submission of the query terms, the search engine may search a corpus of word-tagged images for images that have been tagged with words that match one or more of the query terms. The search engine may then provide, to the user, a search results web page that contains thumbnail versions of the matching images that the search engine found. Unfortunately, these matching images might in some cases actually have very little to do with the query terms that the user entered. The manner in which the words associated with the images become associated with those images is often highly subjective in nature.

For example, an image might have been tagged with several different words by many different users. To each of these different users, the image might seem to be of a different thing. One user might see an image of a mountain in a particular image, and might tag that particular image generically with the word "mountain." Another user might recognize (or mistakenly think) that the mountain in the image is actually in a specific national park, and so that user might tag the same particular with the actually name of the national park (which might or might not be correct). Yet another user, who took the photograph that resulted in the particular image, might recall that the mountain was seen while he was hiking with a certain friend of his on a certain date. That user might then tag the same particular image with the name of his friend, the date on which the photo was taken, and some topical indication like "hiking trip." Most search engines are only able to search images based on textual metadata that largely consists of tags, such as the ones discussed above, attached to those images by various viewers of those images. In some cases, the quantity of metadata attached to an image might be small; such an image might not be produced as a result of many searches.

As a result of the usually highly subjective nature of the searchable metadata that is associated with each image in a searchable corpus of images, the results for a search for an image that matches user-specified query terms can produce a wide variety of images, many of which might not relate in the slightest bit to the topic imagined by the user who specified the query terms. If the user is lucky enough to find, in the search results page, an image in which he is interested, then the user might want to view other images in the search corpus which are deemed to be similar, in some way, to the image in which the user actually was interested. Some Internet search engines display, on the search results web page, a control through which a user can request, from the search engine, additional images that are similar to an image that the user selects from the initial set of image search results. However, automatically determining whether one image actually is "similar" to another image, according to some aspect that the user imagines but does not necessarily express to the search engine, can be a challenging task.

Because existing search engines do not have any sophisticated mechanism for determining what a user really means when the user indicates that he wants to see other image search results that are similar to a selected image, existing search engines often will return, to a user has expressed such a desire, images that are not really similar to the selected image, or images that could be similar to the selected image only in ways about which the user does not really care. Existing search engines' approaches for determining which images are similar to other images, in a way that is likely to satisfy a searching user's desires, are often woefully inadequate. One approach for determining whether two images are similar involves creating, for each of the images, a numerical vector that reflects visual features of that image (such as the number of colors in the image), and then comparing the vectors to each other. If the vectors are similar enough to each other, then the images to which those vectors correspond are also deemed to be similar to each other. Images that have vectors that are similar to each other are deemed to be more similar to each other than images that have vectors that are not similar to each other. In reality, though, even images that have vectors that are similar to each other often will not really pertain to similar content. For example, images that have a similar color palette might pertain to subjects that are not related to each other in any imaginable way (other than being similar in color).

One weakness that plagues existing approaches to determining image similarity is that those approaches are not designed to account for what the user might or might not know about the subject of the image. Often, what the user knows about the subject of the image will be very relevant to what the user wants to see when the user asks to see images that are similar to some selected image. For example, a user might ask to see images that are similar to an image of U.S. President Barack Obama playing in the surf. If the user knows that the person playing in the surf in the image is Barack Obama, then the user probably is interested in seeing more images that pertain to Barack Obama, regardless of whether those images show Barack Obama playing in the surf. However, if the user does not know that the person playing in the surf in the image is Barack Obama, then the user probably is interested in seeing more images of people playing in the surf, regardless of whether those images show Barack Obama at all. Existing approaches for determining whether images are similar do not take into account, at all, what the user might or might not know about the subject of the image for which the user is seeking to find similar images.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments of the present invention are illustrated by way of example, and not by way of limitation, in the figures of the accompanying drawings and in which like reference numerals refer to similar elements and in which:

FIG. 4 shows an example of how text might be interpreted automatically from speech represented in corresponding audio and video sources using a late fusion approach; and FIG. 5 shows an example of how text might be interpreted automatically from speech represented in corresponding audio and video sources using an early fusion approach.

DETAILED DESCRIPTION

Figure 1:
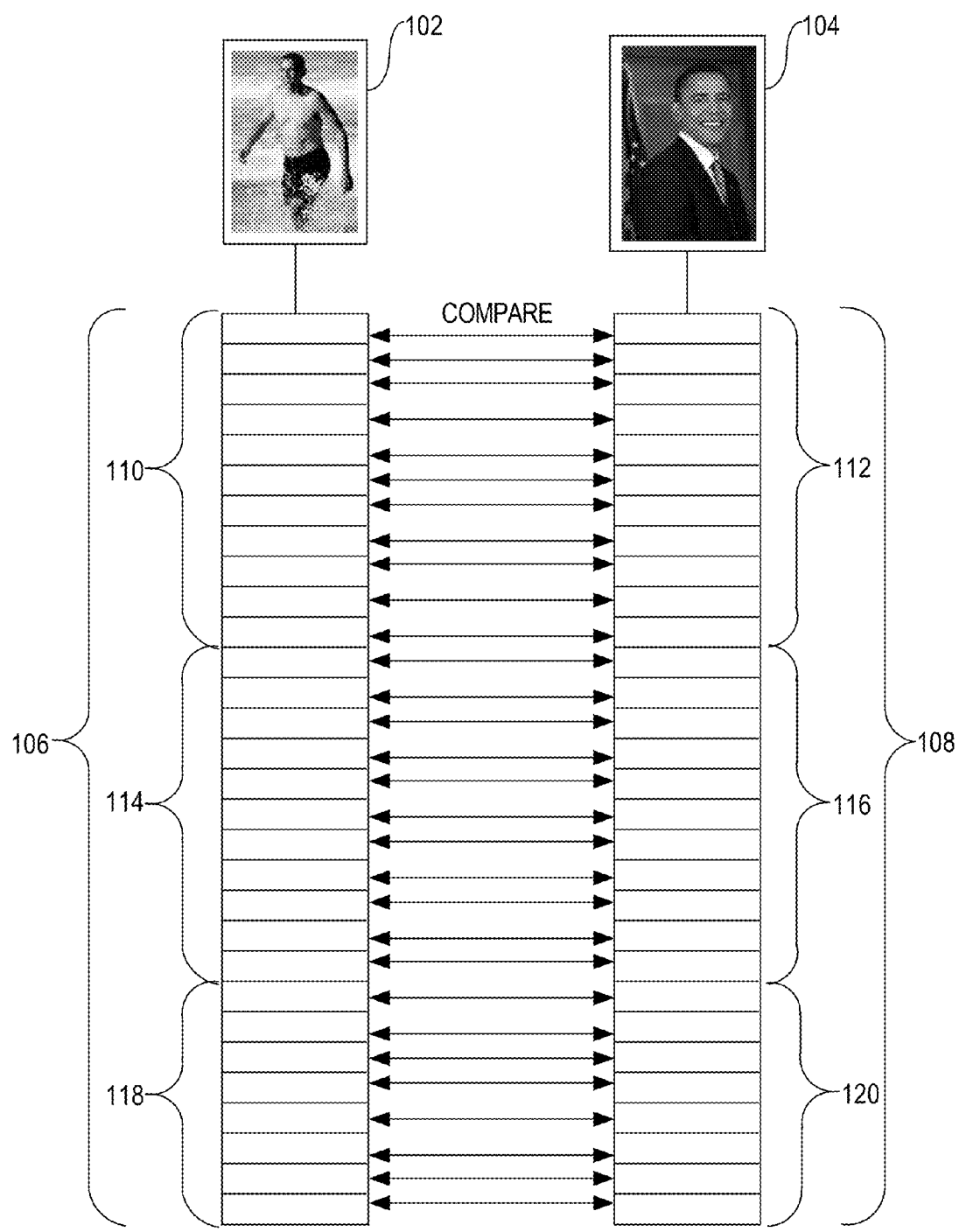
FIG. 1 is a block diagram that illustrates an example of two highly inclusive feature vectors and how they might be compared to determine whether the images are similar enough for one image to be returned as a result to a user's request for images that are similar to the other image, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to techniques described herein, a user submits query terms to an Internet search engine. The search engine responsively determines a set of Internet-accessible images that are relevant to the query terms. The search engine then generates a search results web page that contains thumbnail representations of those of the images that were deemed to be most relevant to the query terms. Additionally, the search results web page generated by the search engine contains one or more user-selectable controls (e.g., a hyperlink) which, when selected by the user, indicates the user's interest in finding more images that are similar to a particular one of the images represented in the search results web page.

According to techniques described herein, in response to a user's activation of such a control with respect to a particular image, the search results engine automatically determines a set of images that are similar to the particular image, and presents those similar images to the user as thumbnails in a web page. Significantly, in determining which images are similar to the particular image, the search engine takes into account information that is known about the subject of the image. This information may include, for example, tags that are associated with the image, the identity of the owner or contributor of the image, and/or other types of information that might be associated with the image.

According to techniques described herein, all of the information that is known about an image—not merely some single facet of the image such as color spectrum—is conglomerated together into a single data structure. Thus, the data structure for an image quantitatively indicates every significant iota of information that is known about the image. All of an image's information is effectively combined into one "space" that is the data structure. This space may include diverse kinds of information, such as community-contributed tag information and geographical coordinates (latitude and longitude) that were associated with the image by the device that produced the image. To determine whether two images are similar, a search engine may compare the contents of those images' data structures. The determination of whether two images are similar therefore takes into account all information that is known about the images, in total.

According to certain embodiments of the invention described herein, different feature types, some of which might not be intuitively expressed as values in a feature vector, are processed in a way that produces values that can be expressed in a feature vector. The distance between two image's feature vectors may then be determined as a measure of the similarity of the two images. For example, in one embodiment of the invention, latent semantic analysis ("LSA") is conducted relative to the textual metadata (e.g., user-submitted tags) that is associated with an image in order to determine the concepts to which that image is probably related—where such concepts might not even be expressed in those terms in the textual metadata itself. Additionally, in one embodiment of the invention, LSA is conducted relative to group membership metadata (e.g., metadata that indicates groups with which an image, or the image's submitter, belong) in order to determine the concepts to which that image's groups (and, by extension, the image itself) is probably related. In one embodiment of the invention, for each concept in a specified universe of concepts, the probability that the image is related to that concept is expressed numerically in that image's feature vector. Consequently, for any particular concept in the concept universe, every image's feature vector may contain a corresponding value that expresses the probability of that image pertaining to that concept.

Although certain embodiments of the invention are discussed in connection with the finding of images that are similar to a user-selected image, alternative embodiments of the invention relate to the finding of other forms of media or resources that are similar to some other user-selected form of media or resource of the same type. For example, although embodiments of the invention may be used for the finding of images that are similar to a particular image, alternative embodiments of the invention may be used for the finding of other audio that is similar to selected audio, or other video that is similar to selected video, etc.

Early Fusion Contrasted With Late Fusion

Certain embodiments of the invention discussed herein follow an "early fusion," as opposed to a "late fusion," approach. FIG. 4 shows an example of how text might be interpreted automatically from speech represented in corresponding audio and video sources using a late fusion approach. Although embodiments of the invention are not necessarily related to the production of text based on speech from audiovisual sources, the discussion below helps to illustrate the difference between early and late fusion.

In the example of FIG. 4, an audio signal 402 represents sound, while a video signal 404 represents visual frames that accompany and correspond to the sound represented by audio signal 402, such that the sound and the visual frames are synchronized. Audio automatic speech recognizer ("ASR") 406 receives audio signal 402 and attempts to discern text that corresponds to the sound represented therein. Audio ASR 406 produces output 410 as a result of this processing. Independently, video ASR 408 receives video signal 404 and attempts to discern text that corresponds to the visual frames represented therein. Video ASR produces output 412 as a result of this processing. Significantly, audio ASR 406 does not have the benefit of video signal 404 when producing output 410, and video ASR 408 does not have the benefit of audio signal 402 when producing output 412. Consequently, output 410 might reflect information that is inconsistent from the information reflected in output 412. For example, output 410 might indicate, based solely on audible clues, that the speech indicates the text "cat," while output 412 might indicate, based solely on visual clues, that the speech indicates the text "cut." Output 410 and output 412 are then fed as input into fusion module 414, which attempts to reconcile the inconsistencies between the results. Fusion module 414 produces text output 418 as a result of this processing. The collective events of FIG. 4 involve "late fusion" because the different types of information (audio and video) are considered independently and separately at first, and then only later are the results of these independent and separate considerations fused together.

FIG. 5, in contrast, shows an example of how text might be interpreted automatically from speech represented in corresponding audio and video sources using an early fusion approach. Similar to the example of FIG. 4, in the example of FIG. 5, an audio signal 502 represents sound, while a video signal 504 represents visual frames that accompany and correspond to the sound represented by audio signal 502, such that the sound and the visual frames are synchronized. However, unlike the example of FIG. 4, in the example of FIG. 5, an audio/video ASR receives both audio signal 502 and video signal 504 as input. Audio/video ASR 514 attempts to discern, based on a combination of the sound and images present in the input, text that corresponds to the audio and video. Audio/video ASR 514 therefore has the benefit of both audio signal 502 and video signal 504 when determining the text that is represented. Because audio/video ASR 514 has a totality of information on which to base its conclusions, audio/video ASR 514 is more likely to arrive at a correct final result than the intermediate results at which either audio ASR 406 or video ASR 408 were able to arrive. Audio/video ASR 514 produces text output 418 as a result of this processing, having inherently fused the processing of audio signal 502 and video signal 504. The collective events of FIG. 5 involve "early fusion" because the different types of information (audio and video) are considered together initially and not independently of each other.

Techniques described herein similarly involve an early fusion approach. The feature vector generated for an image represents diverse types of information, such as visual attributes, tag attributes, geographic coordinate attributes, and/or group attributes. All of these diverse feature types of are considered in combination when the feature vectors of two images are processed to determine the similarity of those two images. This potentially produces a different, and typically better, result than would be produced if features of each type were instead considered independently from each other initially, with the results of each separate consideration fused together only afterward.

Comparing Feature Vectors That Reflect Diverse Features Types

As is discussed above, in one embodiment of the invention, each image is associated with its own separate feature vector, and each such feature vector reflects features that are not just of a single feature type, but features that are of many different feature types. Image features generally are defined as any information about the image, including (a) information that is determinable from the visual contents of the image as well as (b) metadata that is associated with the image but which is not determinable from the visual contents of the image. Various examples of image features of various kinds are discussed below. FIG. 1 is a block diagram that illustrates an example of two highly inclusive feature vectors and how they might be compared to determine whether the images are similar enough for one image to be returned as a result to a user's request for images that are similar to the other image, according to an embodiment of the invention. FIG. 1 shows two images: image 102 and image 104. Image 102 might be, for example, an image that an Internet search engine returned in response to a user's search, in an image sub-corpus or "vertical," for the query terms "Barack Obama." Image 102 might have been returned by the Internet search engine as a search result to the query terms due at least in part to image 102 having previously been tagged, by some other user, with the words "Barack Obama." Image 104 might be, for example, another image in the image sub-corpus. The Internet search engine might be trying to determine whether to return image 104 as a result for a user's request to view more images that are like image 102. Therefore, the Internet search engine might be trying to determine whether image 104 is sufficiently similar to image 102.

As is illustrated in FIG. 1, each of images 102 and 104 is associated with a separate feature vector. Image 102 is associated with feature vector 106, while image 104 is associated with feature vector 108. Each vector has multiple elements or fields, each of which contains a separate value that reflects some information that is known about the image with which the vector is associated. For example, the first entry in each vector might indicate information about the number of colors that are present in the image with which that vector is associated. The types of information that are specified by feature vector 106 are also specified by feature vector 108, such that the fields at a particular position or "index" in one vector reflect the same type of information that the fields at the same particular position in the other vector reflect. However, since images 102 and 104 are not exactly the same, the values specified in each vector may differ even though the same types of fields are contained in both.

Significantly, feature vectors 106 and 108 each contain fields for diverse types of features. As is illustrated in FIG. 1, feature vector 106 contains field type subsections 110, 114, and 118. Feature vector 108 contains field type subsections 112, 116, and 120. Field type subsections 110 and 112 might contain, for example, information about visual attributes of the images to which the vectors correspond; therefore, the features reflected by the fields in subsections 110 and 112 may be called visual attribute features. According to one embodiment of the invention, visual attribute features include any information that can be determined from looking at the visible aspects of the image—including color palette, resolution, size, shapes, etc. A technique for automatically learning image features, including visual attribute features, is disclosed in M. Ranzato, F. Huang, Y. Boreau, and Y. LeCun, "Unsupervised Learning of Invariant Feature Hierarchies with Applications to Object Recognition," (2007), which is incorporated by reference herein. Field type subsections 114 and 116 might contain, for example, information about tags with which the images to which the vectors correspond had been labeled; therefore, the features reflected by the fields in subsections 114 and 116 may be called tag features. Field type subsections 118 and 120 might contain, for example, information about the geographical coordinates of camera that produced the images to which the vectors correspond at that time that those camera produced those images; therefore, the features reflected by the fields in subsections 118 and 120 may be called geographic coordinate features. Thus, each of vectors 106 and 108 contains information about features that are of more than one type. Other types of feature information, in addition to the types specifically discussed above, also may be represented in each vector. For example, group membership information also may be represented in a feature vector. Some of the specific types of feature information that may be represented in a feature vector are discussed in greater detail below.

In one embodiment of the invention, in order to determine whether image 104 is sufficiently similar to image 102 to warrant returning image 104 to a user in response to the user's request to view more images that are similar to image 102, an Internet search engine compares the values of each of the features represented in vector 106 with each of the corresponding features represented in vector 108. In one embodiment of the invention, in order to determine the similarity between two images, the search engine calculates the Euclidean distance of the feature vectors of those images. If the result is greater than a specified threshold value, then the search engine determines that the images are sufficiently similar to each other for one to be returned as a result for a search for images that are similar to the other.

In response to a determination that image 104 is sufficiently similar to image 102, the search engine may return image 104 within a set of images that have been deemed to be similar to image 102. Alternatively, in response to a determination that image 104 is not sufficiently similar to image 102, the search engine may omit image 104 from a set of images that have been deemed to be similar to image 102. Regardless of whether image 104 is chosen to be present within the set of images that have been deemed to be similar to image 102, the search engine may return the set of similar images to the user in response to the user's request to view images that are similar to image 102.

Populating a Vector With Values Derived From Tag Attributes

As is discussed above, in one embodiment of the invention, an image's feature vector contains numerical representations of diverse types of the image's features. However, the procedure for generating a numerical representation of an attribute that is not inherently numerical might not be intuitive. The verbal tags that are associated with an image, for example, may require some processing in order to produce corresponding numerical values that can be represented in a vector and made useful in a mathematical similarity determination. In order to make the various different types of features have relatively equal footing and influence when two images' feature vectors are considered for purposes of determining image similarity, certain embodiments of the invention perform such processing to produce such numerical values for insertion into images' feature vectors.

For example, a particular image of the Eiffel Tower might be labeled with tags such as "Paris," "Eiffel," and "tower." If the image also has the photographer's Uncle John in the foreground, then the image also might be labeled with tags such as "uncle" and "John." As will be discussed in greater detail below, some of these tags may be more valuable in determining image similarity than are others of these tags, and therefore ought to be given different weight and influence in the similarity determination. First, though, techniques for generating numerical values based on these verbal tags are discussed.

In one embodiment of the invention, each possible tag from a specified universe of existing tags (e.g., the set of all tags with which any image in the image corpus has been labeled) is given a slot or element in each image's feature vector. If a particular image has been labeled with a particular tag, then that particular tag's element in the particular image's feature vector is populated with a value of "1;" otherwise, the particular tag's element in the particular image's feature vector is populated with a value of "0." However, this is only one of several possible techniques that may be used.

A more sophisticated technique for populating the tag feature subsection of a feature vector involves latent semantic analysis ("LSA") and resulting concept probabilities. Latent semantic analysis is disclosed in U.S. Pat. No. 4,839,853, which is incorporated by reference herein. In one embodiment of the invention that uses this technique, a set of words is input into a latent semantic analyzer. The set of words is, in one embodiment of the invention, the set of tags (and/or other textual data or metadata) that have been associated with the image by users in an online user community—such as users of a particular image-sharing website. Based on these words, the latent semantic analyzer automatically determines a smaller set of concepts to which the image pertains. The concepts might be thought of as categories to which multiple words from the input might belong. The concepts are also sometimes called "latent topics." The concepts might not be expressly labeled, and there might not be any one-to-one correspondence between any particular tag and a concept that such a tag is determined to match. Thus, part of the output of the latent semantic analyzer is a set of concepts to which the image might pertain, or which describe what the image is about.

For each concept, the latent semantic analyzer determines a corresponding probability. The probability that is associated with a concept indicates the likelihood that the image actually does pertain to, or actually described that the image is about, that concept. Thought of in a different way, the probability that is associated with a concept indicates the likelihood that the tags and/or other text associated with the image actually "contain" or otherwise represent the concept (even if not explicitly). Thus, the latent semantic analyzer outputs a set of concepts and their associated probabilities. In one embodiment of the invention, these probabilities are expressed as values between 0 and 1, with 0 indicating that the corresponding concept is certainly unrelated to the image, and with 1 indicating that the corresponding concept is certainly related to the image. In one embodiment of the invention, the tag attribute subsection of the image's feature vector is populated with these probability values, with each element of the tag attribute subsection of the feature vector containing a different concept's probability. These numeric values then may be used (among other values in the feature vector) to compute the similarity of two images—for example, by computing the Euclidean distance between those images' feature vectors.

Group Network Connection Distance Similarity Determination

In one embodiment of the invention, metadata for each image in the image corpus indicates, along with other information, an identity of a user who "owns" the image. Often, the user who "owns" the image is deemed to be the user who originally uploaded the image to the online image-sharing community web site. Often, this "owner" (usually identified by a unique user identifier) will belong to one or more "user groups" on an online community web site. For example, a user may create a new group, and then invite one or more other users to join that group. The other users may accept or reject the invitation. Alternatively, the other users may proactively ask to join an existing group. Depending on the group, the group's creator, organizer, or mediator might need to give permission for those other user to join the group. In any case, an online community web site might define multiple different groups, and each group may contain one or more different users.

A user who belongs to one group might belong to other groups also. Whenever a particular user belongs to more than one group, all of the groups to which the user belongs are said to be "directly connected." Additionally, an image that has been submitted to (and therefore belongs to) one group might be submitted to (and therefore belong to) other groups also. Whenever a particular image belongs to more than one group, all of the groups to which the image belongs are also said to be "directly connected." Thus, based on the group memberships of the users of an online community web site, and/or based on the groups to which images are submitted in such an web site, a graph of directly connected groups may be generated.

Some groups may be "indirectly connected" rather than "directly connected." For example, if group "A" is directly connected to group "B," and if group "B" is directly connected to group "C," but if group "A" is not directly connected to group "C" (perhaps because there is no single user who is a member of both groups "A" and "C"), then groups "A" and "C" are only "indirectly connected." Specifically, since both groups "A" and "C" are connected to group "B," groups "A" and "C" are said to be connected to each other with a distance of two. Groups that are directly connected to each other (such as group "A" is to group "B") are said to be connected to each other with a distance of one.

In one embodiment of the invention, the similarity of two different images is determined based at least in part on the distance, in connections, between the groups to which the images and/or to which the owners of those images belong. The smaller the distance between the two images and/or owners' groups, the more similar the images are deemed to be. For example, if group "A" is indirectly connected to group "C" with a minimum distance of two, and if group "A" is directly connected to group "B" with a minimum distance of one, then an image whose owner was in group "A" would be deemed to be more similar (in the group-connection aspect, though perhaps not in other aspects) to an image whose owner was in group "B" than an image whose owner was in group "C" (and not in groups "A" or "B"). Images owned by users in the same groups would be deemed to be the most similar of all. Similarly, under like circumstances, an image that belongs to group "A" would be deemed to be more similar (in the group-connection aspect, though perhaps not in other aspects) to an image that belonged to group "B" than an image that belonged to group "C" (and not to groups "A" or "B").

Additionally or alternatively, in one embodiment of the invention, images themselves belong to groups. For example, an image might belong to multiple groups due to that image's owner or submitter expressly submitting or posting that image to groups that the submitter expressly specified. For example, an image's submitter might submit the image to a "bring your own big wheel" group and also to a "San Francisco" group. As a result, the image would be considered to belong to both groups. Because both groups contained the same image, the groups would be considered to be "directly connected," with a distance of one. Thus, group connectivity and distance may be based not only upon the users or people that each group contains, but also (or instead) upon the actual images that each group contains.

In one embodiment of the invention, instead of each group being an "online" group to which users can post images, each group is a real-life organization to which users might belong. If a person belongs to two different organizations, then those organizations (and their corresponding groups) are considered to be "directly connected," with a distance of one.

In one embodiment of the invention, the distance between two groups is determined using Jaccard indexing techniques, which are known in the art.

In one embodiment of the invention, when two images are compared for similarity, the Euclidean distance of those images' feature vectors is determined to obtain a first similarity value, and then a second "group" similarity value is determined based on the distances between the groups to which the images (and/or their owners) belong—the smaller the "group" distance, the greater the second similarity value will be. For example, the second similarity value may be calculated by computing the reciprocal of the distance between the groups. Thus, in such an embodiment of the invention, the group composition and connectivity information discussed above might not be reflected within the feature vector itself, but may be considered separately in the calculation of the second similarity value. The first similarity value may be given a first weight, while the second similarity value may be given a second weight. The weighted first and second similarity values then may be added together to produce a final similarity value, which then may be compares against a specified threshold to determine whether the images are similar enough to warrant displaying one as a result of a request for images that are similar to the other. In one embodiment of the invention, the similarity of two images is determined by multiplying the Euclidean distance of the two images' vectors by $-1$.

However, in an alternative embodiment of the invention, the group information discussed above actually is contained within the feature vector itself, and consequently influences the Euclidean distance determination discussed above. The determination of which images are similar to each other may involve locality sensitive hashing and/or oct trees. Techniques for indicating group information meaningfully within a "group subsection" of a feature vector, so that the group information also influences the Euclidean distance determination, are discussed below.

Group Latent Semantic Analysis

In one embodiment of the invention, a separate word histogram is calculated for each group in the specified universe of groups. Each group's word histogram indicates all of the words that are associated with any of the images in that group, and, for each such word, a word count that indicates a quantity of that group's images that are associated with (e.g., have been tagged with) that word. All of the several groups' word histograms are fed as input into a latent semantic analyzer as training data. Based on the input, the latent semantic analyzer automatically generates a model that allows other groups to be characterized automatically. The generation of the model therefore is based upon machine-learning techniques. A new group (which was not used to generate the model), with its word histogram, can thereafter be compared to the information indicated by the model to determine, automatically, a set of concept probabilities (or "latent topic" probabilities) for that group. A group's set of concept probabilities indicates, for each concept in a specified universe of concepts, the probability that the group (and the images that belong to that group) actually relates to that concept. For example, each such probability may be expressed as a percentage or as a value between zero and one.

In one embodiment of the invention, after the set of concept probabilities have been determined for a group in this manner, all of the group's concept probabilities are added to a "group" subsection of the feature vector of each image in that group. In one embodiment of the invention, if an image belongs to more than one group, then the concept probabilities of each group to which the image belongs are multiplied by each other in order to computer the final concept probabilities with which the "group" subsection of that image's feature vector will be populated. In one embodiment of the invention, for each concept in the specified universe of concepts, each image's feature vector includes (specifically, in the "group" subsection) a separate element that corresponds to that concept and that is populated with the concept probability for that concept, determined in the manner described above.

In such embodiments of the invention, when the Euclidean distance of two feature vectors is determined in order to calculate the measure of similarity between the images that correspond to those feature vectors, the presence of the concept probabilities in each feature vector's "group" subsection influences the calculation. Images that belong to groups that are related to similar concepts consequently will be determined to be more similar to each other than to other images that belong to groups that are not related to those concepts.

Weighting Intermediate-Frequency Concept Probabilities More Heavily

As is discussed above, in one embodiment of the invention, an image's feature vector includes fields that specify information about concept probabilities related to tags that are associated with the image, and/or concept probabilities related to groups with which the images are associated. These tags and/or groups are typically associated with the image by various users in an online image-sharing community. The owner of the image typically uploads the image to an online image-sharing web site (such as "Flickr"), where other users can view the image. The owner of the image, and other users, can then submit, to the web site, tags that are to be associated with the image. The web site creates and stores associations between the image and the tags that users have submitted in relation to the image. An Internet search engine subsequently may examine an image's associated tags in order to determine whether that image is relevant to a set of query terms submitted by another user. For example, an Internet search engine might return, as results of a search for images that were relevant to a set of query terms, all images that were associated with a set of tags that included the query terms.

An observation has been made that some tags tend to be associated with a vast segment of the images that are stored by an online image-sharing web site. These tags are so over-represented that they tend not to be very useful in locating images in which a user might be interested. For example, an observation has been made that the tag "wedding" is associated with a very large proportion of the images that are stored on a particular online image-sharing web site. Because so many images are associated with the tag "wedding," a search for images that are tagged with "wedding" is likely to produce a large number of images, whose subjects might not actually have much in common with each other. Thus, over-represented tags such as "wedding" do not have much discriminatory value.

At the other extreme, some tags are so esoteric and uncommon that even if those tags were to match query terms entered by a user (an unlikely situation), the chance that the tags would have the same meaning as that ascribed to the matching query terms would be so slim that returning the images associated with those tags would not be likely to satisfy the user. For example, a first user might upload an image to an online image-sharing web site and then tag that image with the tag words "Uncle Bob." The first user might do this because the image actually is of the first user's uncle, who is named "Bob." A second user who submits, to an Internet search engine, query terms that include "Uncle" and "Bob" probably will not be interested in the image uploaded by the first user, because the second user has no relation to the man who is the subject of the image, and does not even know the man's name. Thus, under-represented tags such as "Uncle Bob" do not have much value in image search.

Other tags, whose frequencies lie between the over-represented and under-represented extremes, are more likely to be valuable in locating images that match query terms. Therefore, in one embodiment of the invention, the concept probabilities that correspond to these intermediate-frequency tags are given relatively greater value, or weight, when comparing the feature vectors of two images in determining whether the two images are sufficiently similar to each other. In contrast, the concept probabilities corresponding to tags with a very high frequency, and the concept probabilities corresponding to tags with a very low frequency, are given relatively lesser weight when the feature vector comparison is performed.

In one embodiment of the invention, the number of times that each unique tag word occurs as a tag that is associated with any image in an image corpus is determined. Some tag words may be associated with many different images, causing the number of occurrences determined for those tag words to be relatively high. Other tag words may be associated with few different images, causing the number of occurrences determined for those tag words to be relatively low. Based on all of the non-zero numbers of occurrences determined in this manner, the median number of occurrences is then determined. The median number may be determined, for example, by sorting all of the occurring tag words by their numbers of occurrences, locating the median tag word that lies in the middle of the sorted tag word list (approximately halfway between the tag word at the top of the list and the tag word at the bottom of the list), and determining the median number to be the number of occurrences of that median tag word—that is, the number of different images with which the median tag word is associated. In one embodiment of the invention, the positive weight that is given to a tag's related concept probability (making that concept probability more influential in feature vector similarity comparisons) is based on the distance of that tag from the median tag in the sorted tag word list; the farther away from the median tag a particular tag lies in the list, the less positive weight that particular tag's corresponding concept probability will receive in the feature vector comparison. Concept probabilities corresponding to tags that are very close to the median will receive a relatively maximal positive weight (and therefore have relatively high influence in the feature vector comparison), while concept probabilities corresponding to tags that are very close to the extremes of the list will receive a relatively minimal positive weight (and therefore have relatively low influence in the feature vector comparison).

Figure 2:
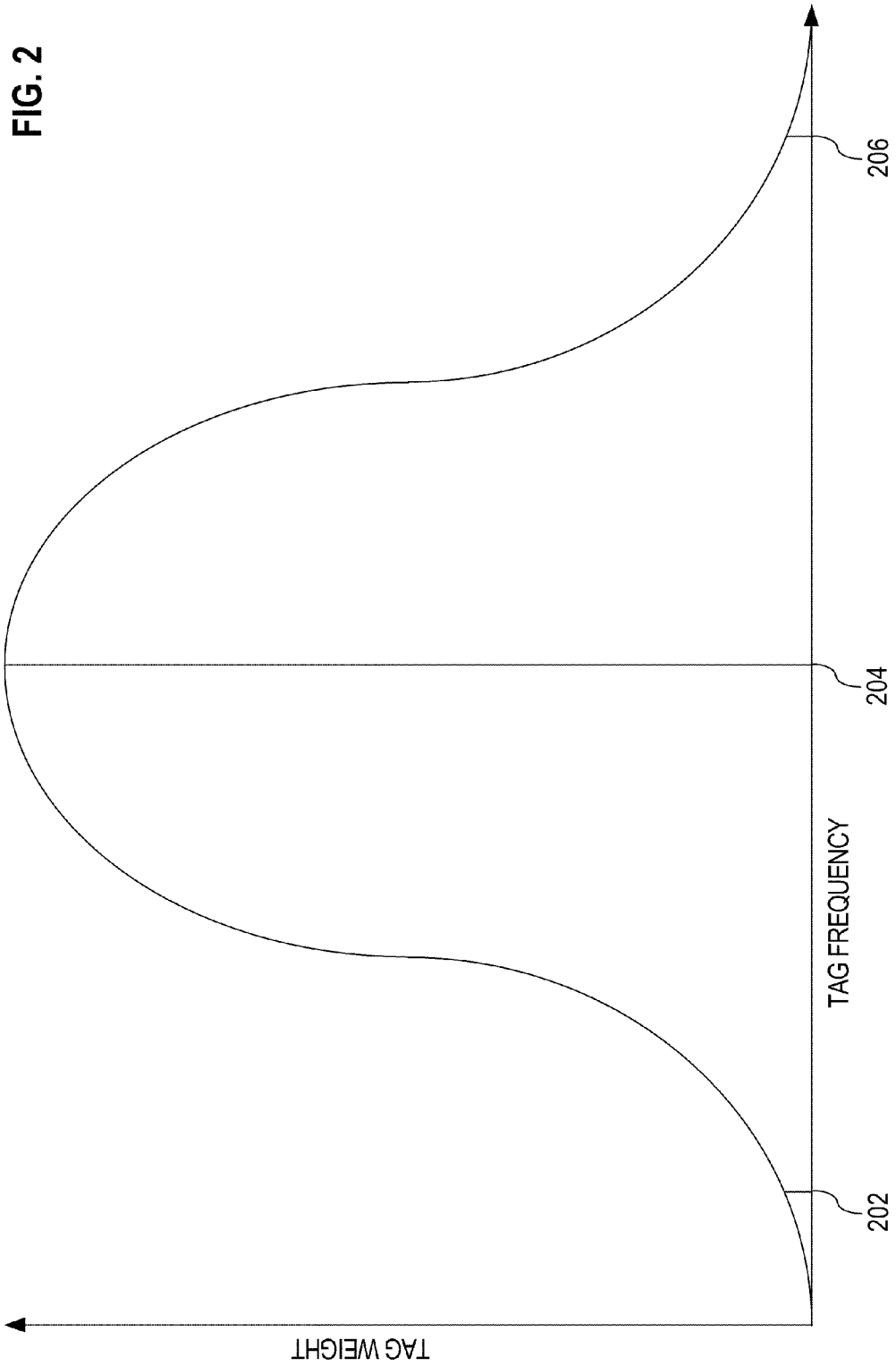
FIG. 2 is a diagram that illustrates a distribution that correlates a tag's frequency, and distance from the median tag's frequency, with the positive weight and influence that the tag is given in the feature vector similarity comparison, according to an embodiment of the invention.

FIG. 2 is a diagram that illustrates a distribution that correlates a tag's frequency, and distance from the median tag's frequency, with the positive weight and influence that the tag's corresponding concept probability is given in the feature vector similarity comparison, according to an embodiment of the invention. In one embodiment of the invention, the weight that is given to a concept probability is derived from a normal (or "bell curve" or "Gaussian") distribution. Tag 202 is associated with very few images in the image corpus. Tag 202 therefore has a very low tag frequency and lies very distant from the median tag. Due to the location of tag 202 at the left-most extreme area of the bell curve, a concept probability corresponding to tag 202 is given a relatively low weight, and will have relatively little influence when determining whether an image that is associated with tag 202 is sufficiently similar to another image.

Tag 206 is associated with very many images in the image corpus. Tag 206 therefore has a very high tag frequency and also lies very distant from the median tag. Due to the location of tag 206 at the right-most extreme area of the bell curve, a concept probability correspond to tag 206 is also given a relatively low weight, and will have relatively little influence when determining whether an image that is associated with tag 206 is sufficiently similar to another image.

In contrast to tags 202 and 206, tag 204 is associated with an intermediate number of images in the image corpus. Tag 204 therefore has an intermediate tag frequency and lies very close to, or at the same location as, the median tag. Due to the location of tag 204 at or nearly at the middle of the bell curve, where the assigned weight is the highest, a concept probability corresponding to tag 204 is given a relatively high weight, and will have relatively heavy influence when determining whether an image that is associated with tag 204 is sufficiently similar to another image.

As is discussed above, one or more fields of an image's feature vector may contain values that are indicative of concept probabilities that have been determined (e.g., using latent semantic analysis on the image's tags) for that image. In one embodiment, a particular image's feature vector contains (in addition to other possible fields) a separate field for each unique concept that is reflected by any image in the image corpus. In one embodiment of the invention, in order to assign weight to a particular concept probability, the value in the field that corresponds to that particular concept probability is multiplied by the weight value for that particular concept probability, as determined by the location, in the tag frequency/weight distribution, of a tag that corresponds to the concept probability.

Although a normal distribution is discussed above, alternative embodiments of the invention may involve distributions other than the normal distribution. In another alternative embodiment of the invention, a "low pass" threshold and a "high pass" threshold are specified. Concept probabilities that correspond to tags having tag frequencies that are lower than the specified "low pass" threshold are given relatively low weights. Similarly, concept probabilities that correspond to tags having tag frequencies that are higher than the specified "high pass" threshold are given relatively low weights. Concept probabilities that correspond to tags having tag frequencies that lie between the low pass and high pass thresholds are given relatively high weights.

Although an embodiment is described above wherein the distance of a tag in a tag distribution is determined, in an alternative embodiment of the invention, a concept distribution is formed instead of a tag distribution, and a weight for a concept probability is determined based on how far from the median of the distribution the corresponding concept occurs.

Normalizing Features Vectors Prior to Comparison

As is discussed above, in one embodiment of the invention, an image's feature vector includes a subsection that indicates numerical values that are indicative of visual qualities of the image (e.g., number of colors, color palette, resolution, dimensions, shapes contained therein, etc.) and also another subsection that indicates numerical values (concept probabilities) that are indicative of tags and/or other text that is associated with the image (but not present in the image itself). In one embodiment of the invention, the values in an entire feature vector are normalized so that the values in one subsection will not have greater influence upon a similarity comparison than the values in another subsection (unless that disparity in influence is desired). After two image's vectors have been normalized, then the Euclidean distance between the two vectors may be calculated to as a measure of how similar the images are to each other.

In one embodiment of the invention, the values in the different subsections of the feature vector are set on "equal footing" prior to Euclidean distance calculation using "nearest neighbor weighting" techniques that are disclosed in M. Slaney, K. Weinberger, and W. White, "Learning a Metric for Music Similarity," ISMIR 2008, pp. 313-318, which is incorporated by reference herein. These techniques ensure that features of different types are weighted properly relative to each other.

In one embodiment of the invention, prior to determining the Euclidean distance between two feature vectors, each of those feature vectors is normalized by dividing each feature vector by that feature vector's magnitude. This causes the feature vectors to have the same "geometric" length. A feature vector's magnitude is equal to the square root of the sum of all of the squares of the values in the feature vector's elements.

In one embodiment of the invention, in order to rank a set of images in their degree of similarity to a user-chosen image, the feature vectors of each of those images is normalized, and then those images are similarity-ranked based on the Euclidean distances of their normalized feature vectors from the normalized feature vector of the user-chosen image. An image's feature vector may be conceptualized as representing a point in multi-dimensional space to which that vector refers. Under such a conception, points that are closer to each other correspond to images that are more similar to each than to images that correspond to points farther away. Each dimension in the space corresponds to a separate element of the vector. Various dimensions in the multi-dimensional space may represent visual attributes of an image, tags and textual data (or LSA-derived concepts) associated with that image, group membership data (or LSA-derived concepts) associated with that image, geographical coordinate data associated with that image, etc. Thus, in one embodiment of the invention, the similarity-representing Euclidean distance between two feature vectors takes into account all of these diverse feature types.

User-Specified Search Options

When a user asks to see images that are similar to a particular image that a user selected from a set of initial image search results, the user might attach any number of different meanings to the word "similar." Therefore, in one embodiment of the invention, in response to a user's indication that the user would like to view images that are similar to a particular selected image, the Internet search engine asks the user one or more additional questions, or presents the user with one or more additional options, in an effort to determine exactly the kinds of similarity in which the user is interested. The search engine then locates, for the user, images that are similar in the specific regards that the user indicated via the answers to the questions and/or the options that the user selected.

In one embodiment of the invention, in response to a user's request to view more images that are similar to a particular image, the Internet search engine presents, as separate selectable options, each of the query terms that the user initially submitted to the search engine-the query terms that caused the search engine to present the initial set of image search results that contained the particular image. For example, if the user initially submitted query terms "Barack Obama beach," then, in one embodiment of the invention, in response to a user's request for similar images, the search engine presents the words "Barack," "Obama," and "beach," with a checkbox next to each word. The search engine asks the user to check the checkbox next to each word in which the user is interested. After the user has checked a set of checkboxes and activated a control that indicates that the user's selection is finalized, the Internet search engine searches for other images that are associated with tags that correspond to the words whose checkboxes the user checked.

In one embodiment of the invention, in response to a user's request to view more images that are similar to a particular image, the Internet search engine presents, as separate selectable options, each of the tag words that are associated with the particular image. The tag words that are associated with the particular image may be different than the set of query terms that the user initially submitted to the search engine, although there may be some overlap between the two sets. For example, if the user asks the search engine to present other images that are similar to a particular image, and if the particular image is associated with tags "Barack," "Obama," "beach," "surf," and "president," then, in one embodiment of the invention, in response to a user's request for similar images, the search engine presents the words "Barack," "Obama," "beach," "surf," and "president," with a checkbox next to each word. The search engine asks the user to check the checkbox next to each word in which the user is interested. Significantly, the words that the search engine presents to the user might not be the same words that the user initially submitted to the search engine as query terms; in the above example, the user might have submitted the query terms "Barack Obama 2008" to the search engine. Thus, the selected image may be tagged with one or more words that are not in the query terms, and the query terms may contain one or more words with which the selected image is not tagged. In such an embodiment of the invention, the set of tags that the search engine presents to the user may be entirely independent of the query terms that caused the search engine to return the particular image to the user in the first place. After the user has checked a set of checkboxes and activated a control that indicates that the user's selection is finalized, the Internet search engine searches for other images that are associated with tags that correspond to the words whose checkboxes the user checked.

In one embodiment of the invention, in response to a user's request to view more images that are similar to a particular image, the Internet search engine presents, as separate selectable options, each "prominent" tag word that is associated with any image in the set of images that the search engine returned in response to the query terms originally submitted by the user. A tag word is "prominent" if the tag word is associated with at least a specified number of images in the set of images that the search engine returned. The set of "prominent" tag words may differ from the set of tag words that are associated with the particular image, although there may be some overlap between the two sets. For example, if the user asks the search engine to present other images that are similar to a particular image, and if most of the images that were presented with the particular image in the initial search results are associated with the tags "Barack," "Obama," and "president," then, in one embodiment of the invention, in response to a user's request for similar images, the search engine presents the words "Barack," "Obama," and "president," with a checkbox next to each word. The search engine asks the user to check the checkbox next to each word in which the user is interested. Significantly, the "prominent" words that the search engine presents to the user might not be the same words with which the user-selected image (the one for which the user wants to see similar images) is tagged. Thus, the selected image may be tagged with one or more words that are not in the list of "prominent" tags, and the list of "prominent" tags may contain one or more words with which the selected image is not tagged. In such an embodiment of the invention, the set of tags that the search engine presents to the user may be entirely independent of the tags that are associated with the selected image. After the user has checked a set of checkboxes and activated a control that indicates that the user's selection is finalized, the Internet search engine searches for other images that are associated with tags that correspond to the words whose checkboxes the user checked.

In one embodiment of the invention, in response to a user's request to view more images that are similar to a particular image, the Internet search engine asks the user whether the user is interested in other images that were produced (or "taken" by a digital camera or other device) at approximately the same geographic coordinates as the particular image. If the user responds affirmatively to this question, then the search engine searches the image corpus for images that are associated with geographical coordinates that are within a specified range of the geographic coordinates that are associated with the particular image. Under such circumstances, the search engine may disregard other features, such as verbal tags and visual attributes, in determining which similar images to show to the user.

In one embodiment of the invention, in response to a user's request to view more images that are similar to a particular image, the Internet search engine asks the user whether the user is interested in other images that have visual attributes (e.g., shapes, colors, resolution, dimension, etc.) that are similar to those of the particular image. If the user responds affirmatively to this question, then the search engine searches the image corpus for images that are associated with visual attribute values that are within a specified range of the visual attribute values that are associated with the particular image. Under such circumstances, the search engine may disregard other features, such as verbal tags and geographical coordinates, in determining which similar images to show to the user.

Often, the reason why a user might be interested in finding images that are similar to a selected image is because the selected image is subject to licensing restrictions (e.g., the image is copyrighted) that the user would like to avoid. Therefore, in one embodiment of the invention, the Internet search engine provides the user with an ability to specify whether the user only wants to see similar images that do not have any licensing restrictions. In such an embodiment of the invention, each image in the image corpus is associated with metadata that indicates, among other information, whether that image has any licensing restrictions (e.g,. whether the image is copyrighted, or whether the image is in the public domain). In response to the user's indication that the user only wants to see similar images that do not have any licensing restrictions, the Internet search engine determines a set of images that are both (a) sufficiently similar to the user-selected image, using techniques discussed above, and (b) are associated with metadata that indicates that no licensing restrictions exist. The search engine then returns this set of images to the user in response to the user's request to see other images that are similar to the selected image.

In one embodiment of the invention, the Internet search engine asks the searching user whether the user is interested in seeing only other images that are owned by the same "owner" as a user-selected image. In response to the searching user's indication that the user only wants to see those types of images, the Internet search engine filters out, from the set of similar images that the search engine returns to the user, all images that are not owned by the same "owner" as the user-selected image.

In one embodiment of the invention, the feature vector for each image in the image corpus indicates, along with other information, an identity of an "image group" to which the image belongs. Often, when a user uploads an image to an online image-sharing community web site, the user does so in the context of uploading multiple images in a batch; these images uploaded in a batch may be deemed to belong to a same "image group" by default. Alternatively, the uploading user (or any other user, for that matter) may expressly create an "image group" on the image-sharing community web site, and add selected images to that group. A particular image may potentially belong to multiple different image groups. In one embodiment of the invention, the Internet search engine asks the searching user whether the user is interested in seeing only other images that in the same "image group" as a user-selected image. In response to the searching user's indication that the user only wants to see those types of images, the Internet search engine filters out, from the set of similar images that the search engine returns to the user, all images that are not in a same "image group" as the user-selected image. If the selected image belongs to more than one "image group," then the set of similar images returned to the user may potentially come from more than one group.

Similarity Based on Aggregate User Click Behavior

In one embodiment of the invention, the Internet search engine presents a user with an option which, when selected by the user, indicates the user's interest in seeing other images that were also "clicked on" (or otherwise selected) by other users who also "clicked on" (or otherwise selected) a particular image. For example, an Internet search engine may display an initial set of images as search results produced in response to the receipt of query terms submitted by the user. The user may then pick a particular one of those images, and then instruct the search engine to show the user other images that were clicked on by other users who clicked on the particular image as well. In response to the user's request, the Internet search engine locates, in the image corpus, each image that was clicked on by another user that also clicked on the particular image. Metadata indicating the identity of each user that clicked on each image may be stored in association with each image in the image corpus, and updated each time that a user clicks on an image. The search engine returns, to the user, a web page that shows a set of other images that were also clicked on by other users who clicked on the particular image that the user previously selected.

The web page containing the set of images clicked on by the other users may be ordered according to a ranking function. In one embodiment of the invention, each image's rank is based on the number of distinct users who clicked on both (a) that image and (b) the previously-specified particular image. As this number becomes greater, the image's rank becomes higher. Images which were clicked on by many of the same users that clicked on the particular image are displayed earlier in the results web page than image which were clicked on by only a few of the same users that clicked on the particular image.

Determining Similarities of Non-Image Resources

As is mentioned above, embodiments of the invention are not limited to those which determine the similarities between still images. In one embodiment of the invention, an Internet search engine determines whether two motion video files are sufficiently similar to each other, and, if they are, then the search engine returns one in response to a user's search for videos that are similar to the other. In such an embodiment, the comparison may be made on a frame-by-frame basis, with each frame in one video being compared to each frame in another video in the same manner in which two images are compared to each other. In one embodiment of the invention, each "shot" in a video is separately defined, with the feature vector for each video including attributes of all of that video's "shots." Thus, when two videos are compared for similarity, the "shot attributes" contained in those videos' feature vectors are compared.

In one embodiment of the invention, an Internet search engine determines whether two audio files (music, for example) are sufficiently similar to each other, and, if they are, then the search engine returns one in response to a user's search for audio that is similar to the other. In one embodiment of the invention, the feature vector for each audio file indicates various aspects of a spectrogram (which shows frequency over time) of the contents of that audio file. In order to determine whether two audio files are sufficiently similar to each other, the search engine compares the spectrogram-feature-indicating vectors of the audio files to each other.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
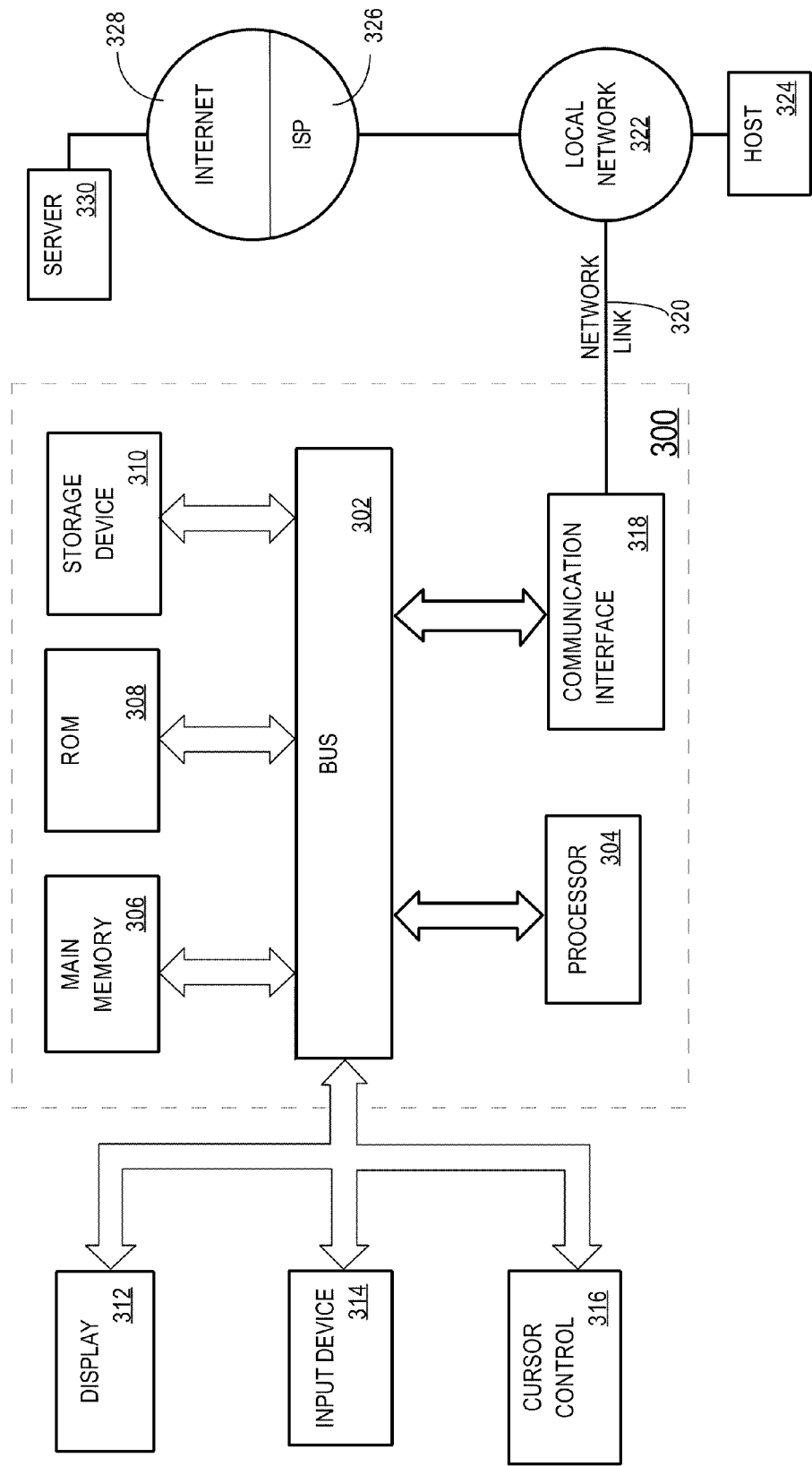
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising steps of:
   determining, for each image in a plurality of images, a set of metadata for the image, said metadata including, for each concept of a plurality of concepts, values that indicate the probability that said each image pertains to said concept;

generating, for each particular image in the plurality of images, a data structure that contains information regarding the set of metadata for the particular image;

in response to a particular user's request to find other images that are similar to a selected image, comparing values in the data structure that was generated for the selected image to values in the data structure that was generated for a candidate search result image in the plurality of images; and in response to determining that a result of the comparing exceeds a specified threshold, presenting at least the candidate search result image to the user as an image that is similar to the selected image;

wherein determining the set of metadata for the image comprises determining: (a) a set of attributes that reflect visual characteristics that are visible in the image, (b) a set of tags that have been associated with the image by one or more users in a community of users, (c) a set of concepts to which tags in the set of tags are related, and (d) for each concept in the set of concepts, a probability that the set of tags reflects the concept, thereby producing a set of concept probabilities for the image;

wherein generating the data structure that contains information regarding the set of metadata for the particular image comprises generating a particular data structure that contains information regarding the (a) the set of attributes determined for the particular image, and (b) the set of concept probabilities determined for the particular image;

for each particular tag in the set of tags determined for the particular image, (a) determining a quantity of different images, in the plurality of images, with which the particular tag is associated, and (b) weighting a value for a particular concept probability, in the data structure that was generated for the particular image, based at least part on said quantity.

wherein the steps are performed by one or more computing devices.

2. A computer-implemented method comprising steps of:

determining, for each image in a plurality of images, a set of metadata for the image;

generating, for each particular image in the plurality of images, a data structure that contains information regarding the set of metadata for the particular image;

in response to a particular user's request to find other images that are similar to a selected image, comparing values in the data structure that was generated for the selected image to values in the data structure that was generated for a candidate search result image in the plurality of images; and in response to determining that a result of the comparing exceeds a specified threshold, presenting at least the candidate search result image to the user as an image that is similar to the selected image;

wherein determining the set of metadata for the image comprises determining: (a) a set of attributes that reflect visual characteristics that are visible in the image, (b) a set of tags that have been associated with the image by one or more users in a community of users, (c) a set of concepts to which tags in the set of tags are related, and (d) for each concept in the set of concepts, a probability that the set of tags reflects the concept, thereby producing a set of concept probabilities for the image;

wherein generating the data structure that contains information regarding the set of metadata for the particular image comprises generating a particular data structure that contains information regarding the (a) the set of attributes determined for the particular image, and (b) the set of concept probabilities determined for the particular image;

for each particular tag in the set of tags determined for the particular image, (a) determining a quantity of different images, in the plurality of images, with which the particular tag is associated, and (b) weighting a value for a particular concept probability, in the data structure that was generated for the particular image, based at least part on said quantity;

wherein weighting the value for the particular concept probability comprises determining a location, within a distribution of different tags' quantities, at which the particular tag's quantity lies, and weighting the value for the particular concept probability based at least in part on a distance of the particular tag's location from a median of the distribution;

wherein the steps are performed by one or more computing devices.

3. A computer-implemented method comprising steps of:

determining, for each image in a plurality of images, a set of metadata for the image;

generating, for each particular image in the plurality of images, a data structure that contains information regarding the set of metadata for the particular image;

in response to a particular user's request to find other images that are similar to a selected image, comparing values in the data structure that was generated for the selected image to values in the data structure that was generated for a candidate search result image in the plurality of images; and in response to determining that a result of the comparing exceeds a specified threshold, presenting at least the candidate search result image to the user as an image that is similar to the selected image;

wherein determining the set of metadata for the image comprises determining: (a) a set of attributes that reflect visual characteristics that are visible in the image, (b) a set of tags that have been associated with the image by one or more users in a community of users, (c) a set of concepts to which tags in the set of tags are related, and (d) for each concept in the set of concepts, a probability that the set of tags reflects the concept, thereby producing a set of concept probabilities for the image;

wherein generating the data structure that contains information regarding the set of metadata for the particular image comprises generating a particular data structure that contains information regarding the (a) the set of attributes determined for the particular image, and (b) the set of concept probabilities determined for the particular image;

for each particular tag in the set of tags determined for the particular image, (a) determining a quantity of different images, in the plurality of images, with which the particular tag is associated, and (b) weighting a value for a particular concept probability, in the data structure that was generated for the particular image, based at least part on said quantity;

wherein weighting the value for the particular concept probability comprises decreasing an extent of influence that the value for the particular concept probability will have on said comparing as a distance of the particular tag's quantity becomes farther away from a median of a distribution of different tags' quantities;

wherein the steps are performed by one or more computing devices.

4. A computer-implemented method comprising steps of:

receiving a user's request to view other images that are deemed to be similar to a first image;

determining a first group with which the first image is associated;

determining a first set of concepts based at least in part on textual data that are associated with multiple images in the first group;

determining a first set of concept probabilities for concepts in the first set of concepts;

populating at least a subsection of a first feature vector with concepts in the first set of concept probabilities;

determining a second group with which a second image is associated;

determining a second set of concepts based at least in part on textual data that are associated with multiple images in the second group;

determining a second set of concept probabilities for concepts in the second set of concepts;

populating at least a subsection of a second feature vector with concepts in the second set of concept probabilities;

determining a Euclidean distance based at least in part on the first feature vector and the second feature vector; and based at least in part on the Euclidean distance, selecting the second image from an image corpus for inclusion within a set of other images that are deemed to be similar to the first image;

presenting the set of other images to a user from which the request was received; and weighting one or more concept probabilities in the first feature vector based at least in part on how far from a median of a concept probability distribution the one or more concept probabilities in the first feature vector occur in the concept probability distribution;

wherein the steps are performed by one or more computing devices.

5. A non-transitory computer-readable storage medium storing one or more instructions which, when executed by one or more processors, cause the one or more processors to perform steps comprising:

determining, for each image in a plurality of images, a set of metadata for the image, said metadata including, for each concept of a plurality of concepts, values that indicate the probability that said each image pertains to said concept;

generating, for each particular image in the plurality of images, a data structure that contains information regarding the set of metadata for the particular image;

in response to a particular user's request to find other images that are similar to a selected image, comparing values in the data structure that was generated for the selected image to values in the data structure that was generated for a candidate search result image in the plurality of images; and in response to determining that a result of the comparing exceeds a specified threshold, presenting at least the candidate search result image to the user as an image that is similar to the selected image;

wherein determining the set of metadata for the image comprises determining: (a) a set of attributes that reflect visual characteristics that are visible in the image, (b) a set of tags that have been associated with the image by one or more users in a community of users, (c) a set of concepts to which tags in the set of tags are related, and (d) for each concept in the set of concepts, a probability that the set of tags reflects the concept, thereby producing a set of concept probabilities for the image;

wherein generating the data structure that contains information regarding the set of metadata for the particular image comprises generating a particular data structure that contains information regarding the (a) the set of attributes determined for the particular image, and (b) the set of concept probabilities determined for the particular image;

for each particular tag in the set of tags determined for the particular image, (a) determining a quantity of different images, in the plurality of images, with which the particular tag is associated, and (b) weighting a value for a particular concept probability, in the data structure that was generated for the particular image, based at least part on said quantity.

wherein the steps are performed by one or more computing devices.

6. A non-transitory computer-readable storage medium storing one or more instructions which, when executed by one or more processors, cause the one or more processors to perform steps comprising:

determining, for each image in a plurality of images, a set of metadata for the image;

generating, for each particular image in the plurality of images, a data structure that contains information regarding the set of metadata for the particular image;

in response to a particular user's request to find other images that are similar to a selected image, comparing values in the data structure that was generated for the selected image to values in the data structure that was generated for a candidate search result image in the plurality of images; and in response to determining that a result of the comparing exceeds a specified threshold, presenting at least the candidate search result image to the user as an image that is similar to the selected image;

wherein determining the set of metadata for the image comprises determining: (a) a set of attributes that reflect visual characteristics that are visible in the image, (b) a set of tags that have been associated with the image by one or more users in a community of users, (c) a set of concepts to which tags in the set of tags are related, and (d) for each concept in the set of concepts, a probability that the set of tags reflects the concept, thereby producing a set of concept probabilities for the image;

wherein generating the data structure that contains information regarding the set of metadata for the particular image comprises generating a particular data structure that contains information regarding the (a) the set of attributes determined for the particular image, and (b) the set of concept probabilities determined for the particular image;

for each particular tag in the set of tags determined for the particular image, (a) determining a quantity of different images, in the plurality of images, with which the particular tag is associated, and (b) weighting a value for a particular concept probability, in the data structure that was generated for the particular image, based at least part on said quantity;

wherein weighting the value for the particular concept probability comprises determining a location, within a distribution of different tags' quantities, at which the particular tag's quantity lies, and weighting the value for the particular concept probability based at least in part on a distance of the particular tag's location from a median of the distribution;

wherein the steps are performed by one or more computing devices.

7. A non-transitory computer-readable storage medium storing one or more instructions which, when executed by one or more processors, cause the one or more processors to perform steps comprising:

determining, for each image in a plurality of images, a set of metadata for the image;

generating, for each particular image in the plurality of images, a data structure that contains information regarding the set of metadata for the particular image;

in response to a particular user's request to find other images that are similar to a selected image, comparing values in the data structure that was generated for the selected image to values in the data structure that was generated for a candidate search result image in the plurality of images; and in response to determining that a result of the comparing exceeds a specified threshold, presenting at least the candidate search result image to the user as an image that is similar to the selected image;

wherein determining the set of metadata for the image comprises determining: (a) a set of attributes that reflect visual characteristics that are visible in the image, (b) a set of tags that have been associated with the image by one or more users in a community of users, (c) a set of concepts to which tags in the set of tags are related, and (d) for each concept in the set of concepts, a probability that the set of tags reflects the concept, thereby producing a set of concept probabilities for the image;

wherein generating the data structure that contains information regarding the set of metadata for the particular image comprises generating a particular data structure that contains information regarding the (a) the set of attributes determined for the particular image, and (b) the set of concept probabilities determined for the particular image;

for each particular tag in the set of tags determined for the particular image, (a) determining a quantity of different images, in the plurality of images, with which the particular tag is associated, and (b) weighting a value for a particular concept probability, in the data structure that was generated for the particular image, based at least part on said quantity;

wherein weighting the value for the particular concept probability comprises decreasing an extent of influence that the value for the particular concept probability will have on said comparing as a distance of the particular tag's quantity becomes farther away from a median of a distribution of different tags' quantities;

wherein the steps are performed by one or more computing devices.

8. A non-transitory computer-readable storage medium storing one or more instructions which, when executed by one or more processors, cause the one or more processors to perform steps comprising:

receiving a user's request to view other images that are deemed to be similar to a first image;

determining a first group with which the first image is associated;

determining a first set of concepts based at least in part on textual data that are associated with multiple images in the first group;

determining a first set of concept probabilities for concepts in the first set of concepts;

populating at least a subsection of a first feature vector with concepts in the first set of concept probabilities;

determining a second group with which a second image is associated;

determining a second set of concepts based at least in part on textual data that are associated with multiple images in the second group;

determining a second set of concept probabilities for concepts in the second set of concepts;

populating at least a subsection of a second feature vector with concepts in the second set of concept probabilities;

determining a Euclidean distance based at least in part on the first feature vector and the second feature vector; and based at least in part on the Euclidean distance, selecting the second image from an image corpus for inclusion within a set of other images that are deemed to be similar to the first image;

presenting the set of other images to a user from which the request was received; and weighting one or more concept probabilities in the first feature vector based at least in part on how far from a median of a concept probability distribution the one or more concept probabilities in the first feature vector occur in the concept probability distribution;

wherein the steps are performed by one or more computing devices.

9. An apparatus comprising:

one or more storage devices storing a plurality of images;

one or more metadata logic components configured to
determine, for each image in the plurality of images stored on the one or more storage devices, a set of metadata for the image, the metadata including, for each concept of a plurality of concepts, values that indicate the probability that the each image pertains to the concept, wherein determining the set of metadata for the image comprises determining: (a) a set of attributes that reflect visual characteristics that are visible in the image, (b) a set of tags that have been associated with the image by one or more users in a community of users, (c) a set of concepts to which tags in the set of tags are related, and (d) for each concept in the set of concepts, a probability that the set of tags reflects the concept, thereby producing a set of concept probabilities for the image, determine, for each particular tag in the set of tags determined for the particular image, (a) a quantity of different images, in the plurality of images, with which the particular tag is associated, and (b) weighting a value for a particular concept probability, in the data structure that was generated for the particular image, based at least part on the quantity; and generate, for each particular image in the plurality of images, a data structure that contains information regarding the set of metadata for the particular image, wherein generating the data structure that contains information regarding the set of metadata for the particular image comprises generating a particular data structure that contains information regarding the (a) the set of attributes determined for the particular image, and (b) the set of concept probabilities determined for the particular image; and a search engine configured to receive a particular user's request to find other images that are similar to a selected image, respond to the request by comparing values in the data structure that was generated for the selected image to values in the data structure that was generated for a candidate search result image in the plurality of images, and respond to determining that a result of the comparing exceeds a specified threshold by presenting at least the candidate search result image to the user as an image that is similar to the selected image.

10. An apparatus comprising:
one or more storage devices storing a plurality of images;
one or more metadata logic components configured to
    determine, for each image in the plurality of images stored on the one or more storage devices, a set of metadata for the image, wherein determining the set of metadata for the image comprises determining: (a) a set of attributes that reflect visual characteristics that are visible in the image, (b) a set of tags that have been associated with the image by one or more users in a community of users, (c) a set of concepts to which tags in the set of tags are related, and (d) for each concept in the set of concepts, a probability that the set of tags reflects the concept, thereby producing a set of concept probabilities for the image,
    determine, for each particular tag in the set of tags determined for the particular image, (a) a quantity of different images, in the plurality of images, with which the particular tag is associated, and (b) weighting a value for a particular concept probability, in the data structure that was generated for the particular image, based at least part on the quantity; and
    generate, for each particular image in the plurality of images, a data structure that contains information regarding the set of metadata for the particular image, wherein generating the data structure that contains information regarding the set of metadata for the particular image comprises generating a particular data structure that contains information regarding the (a) the set of attributes determined for the particular image, and (b) the set of concept probabilities determined for the particular image;
    wherein weighting the value for the particular concept probability comprises determining a location, within a distribution of different tags' quantities, at which the particular tag's quantity lies, and weighting the value for the particular concept probability based at least in part on a distance of the particular tag's location from a median of the distribution; and
a search engine configured to receive a particular user's request to find other images that are similar to a selected image, respond to the request by comparing values in the data structure that was generated for the selected image to values in the data structure that was generated for a candidate search result image in the plurality of images, and respond to determining that a result of the comparing exceeds a specified threshold by presenting at least the candidate search result image to the user as an image that is similar to the selected image.

11. An apparatus comprising:
one or more storage devices storing a plurality of images;
one or more metadata logic components configured to
    determine, for each image in the plurality of images stored on the one or more storage devices, a set of metadata for the image, wherein determining the set of metadata for the image comprises determining: (a) a set of attributes that reflect visual characteristics that are visible in the image, (b) a set of tags that have been associated with the image by one or more users in a community of users, (c) a set of concepts to which tags in the set of tags are related, and (d) for each concept in the set of concepts, a probability that the set of tags reflects the concept, thereby producing a set of concept probabilities for the image,
    determine, for each particular tag in the set of tags determined for the particular image, (a) a quantity of different images, in the plurality of images, with which the particular tag is associated, and (b) weighting a value for a particular concept probability, in the data structure that was generated for the particular image, based at least part on the quantity; and
    generate, for each particular image in the plurality of images, a data structure that contains information regarding the set of metadata for the particular image, wherein generating the data structure that contains information regarding the set of metadata for the particular image comprises generating a particular data structure that contains information regarding the (a) the set of attributes determined for the particular image, and (b) the set of concept probabilities determined for the particular image;
    wherein weighting the value for the particular concept probability comprises decreasing an extent of influence that the value for the particular concept probability will have on said comparing as a distance of the particular tag's quantity becomes farther away from a median of a distribution of different tags' quantities; and
a search engine configured to receive a particular user's request to find other images that are similar to a selected image, respond to the request by comparing values in the data structure that was generated for the selected image to values in the data structure that was generated for a candidate search result image in the plurality of images, and respond to determining that a result of the comparing exceeds a specified threshold by presenting at least the candidate search result image to the user as an image that is similar to the selected image.

12. An apparatus comprising:
one or more processors; and
one or more memories storing instructions which, when processed by the one or more processors, cause:
    receiving a user's request to view other images that are deemed to be similar to a first image;
    determining a first group with which the first image is associated;
    determining a first set of concepts based at least in part on textual data that are associated with multiple images in the first group;
    determining a first set of concept probabilities for concepts in the first set of concepts;
    populating at least a subsection of a first feature vector with concepts in the first set of concept probabilities;
    determining a second group with which a second image is associated;
    determining a second set of concepts based at least in part on textual data that are associated with multiple images in the second group;
    determining a second set of concept probabilities for concepts in the second set of concepts;
    populating at least a subsection of a second feature vector with concepts in the second set of concept probabilities;
    determining a Euclidean distance based at least in part on the first feature vector and the second feature vector; and based at least in part on the Euclidean distance, selecting the second image from an image corpus for inclusion within a set of other images that are deemed to be similar to the first image;

presenting the set of other images to a user from which the request was received; and weighting one or more concept probabilities in the first feature vector based at least in part on how far from a median of a concept probability distribution the one or more concept probabilities in the first feature vector occur in the concept probability distribution.

\* \* \* \* \*